(12) United States Patent
Rumsey

(10) Patent No.: US 7,920,648 B2
(45) Date of Patent: Apr. 5, 2011

(54) SAMPLE RATE ADAPTION IN SIGNAL PROCESSING

(75) Inventor: Michael McNiven Rumsey, Royston (GB)

(73) Assignees: MStar Semiconductor, Inc. (KY); MStar Software R&D, Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 751 days.

(21) Appl. No.: 10/538,784

(22) PCT Filed: Dec. 5, 2003

(86) PCT No.: PCT/GB03/05293
§ 371 (c)(1),
(2), (4) Date: Jun. 10, 2005

(87) PCT Pub. No.: WO2004/054124
PCT Pub. Date: Jun. 24, 2004

(65) Prior Publication Data
US 2006/0052076 A1    Mar. 9, 2006

(30) Foreign Application Priority Data
Dec. 10, 2002  (GB) .................................. 0228822.3

(51) Int. Cl.
*H03K 9/00* (2006.01)
(52) U.S. Cl. ........ 375/316; 375/329; 375/334; 375/350; 455/324; 455/552.1; 455/553.1
(58) Field of Classification Search ................... 375/316
See application file for complete search history.

(56) References Cited

U.S. PATENT DOCUMENTS

| 5,168,375 | A  | * | 12/1992 | Reisch et al. ............... 382/250 |
| 5,321,559 | A  | * | 6/1994  | Nguyen et al. ................ 360/46 |
| 5,717,617 | A  | * | 2/1998  | Chester ....................... 708/313 |
| 5,870,402 | A  |   | 2/1999  | Kelley |
| 6,229,856 | B1 | * | 5/2001  | Diab et al. ................... 375/316 |
| 6,256,358 | B1 |   | 7/2001  | Whikehart et al. |
| 6,266,365 | B1 | * | 7/2001  | Wang et al. .................. 375/150 |
| 6,567,666 | B2 | * | 5/2003  | Czaja et al. .................. 455/442 |
| 6,625,279 | B1 | * | 9/2003  | Eom ....................... 379/406.01 |

(Continued)

FOREIGN PATENT DOCUMENTS

WO     WO 98 17012      4/1998

(Continued)

OTHER PUBLICATIONS

Dieter Bruckmann, "*Optimized Digital Signal Processing For Flexible Receivers*," Department of Electrical Engineering and Information Technology, University of Wuppertal, Germany, 2002 IEEE 0-7803-7402-9/02, pp. IV-3764-IV to IV-3767.

(Continued)

*Primary Examiner* — Shuwang Liu
*Assistant Examiner* — Lihong Yu
(74) *Attorney, Agent, or Firm* — Edell, Shapiro & Finnan, LLC

(57) ABSTRACT

The mixed signal chip (10) takes analogue signals received at, for example, a mobile telephone and converts them to the digital domain for subsequent processing. Through use of sample rate adaption and adjustable filtering, the mixed signal chip can work on radio signals formatted according to different standards.

21 Claims, 4 Drawing Sheets

U.S. PATENT DOCUMENTS 6,694,129 B2 * 2/2004 Peterzell et al. ............... 455/76
6,954,628 B2 * 10/2005 Minnis et al. ............... 455/324

FOREIGN PATENT DOCUMENTS

| WO | WO 98/17012 | 4/1998 |
| WO | WO 98/57467 | 12/1998 |
| WO | WO 98 57467 | 12/1998 |
| WO | WO 99/09721 | 2/1999 |
| WO | WO 99 09721 | 2/1999 |
| WO | WO 99 34625 | 7/1999 |
| WO | WO 99/34625 | 7/1999 |

OTHER PUBLICATIONS

International Search Report for PCT Application No. GB 03/05293, mailed Mar. 30, 2004.

* cited by examiner

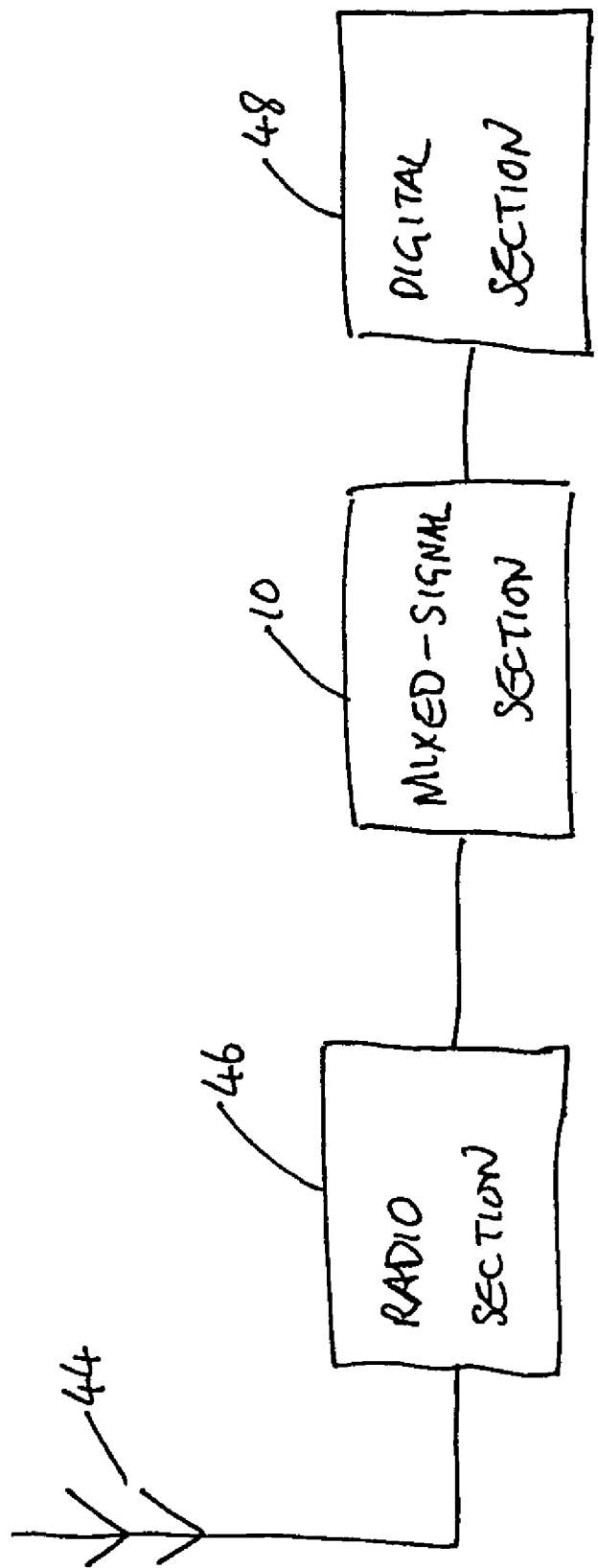

SAMPLE RATE ADAPTION IN SIGNAL PROCESSING

CROSS REFERENCE TO RELATED APPLICATIONS

This application is a national phase application based on international application No. PCT/GB2003/005293, filed Dec. 5, 2003, which claims the priority of Great Britain Patent Application No. 0228822.3, filed Dec. 10, 2002, the content of both of which is incorporated herein by reference.

The invention relates to the field of signal processing, particularly in communications systems.

From the perspective of signal reception, a mobile telephone typically comprises an antenna for receiving wireless signals transmitted to the telephone, a radio section for processing signals received on the antenna (e.g. amplification, frequency-conversion) and a digital section for manipulating the signals that are supplied by the radio section in order to recover information (such as speech) contained in the signals received on the antenna. Since the radio and digital sections operate on analogue and digital signals respectively, a mixed-signal section is provided between them. The mixed-signal section performs analogue to digital conversion (ADC) of the signals supplied by the radio section and conditions the resulting digital signals to render them suitable for processing by the digital section of the mobile telephone.

The manner in which a wireless telecommunications network operates depends upon the technical standard under which the network has been designed to operate. That is to say, there are a number of technical standards, each setting out a different scheme for operating a wireless telecommunications network. Examples of such technical standards are GSM, AMPS, CDMAOne and UMTS. Thus, it follows that the functionality of a mobile telephone will be dictated, to a large extent, by the technical standard for which it is intended. It also follows that a mobile telephone can only operate in a geographical location provided with coverage by a telecommunications network that is aligned to the same technical standard as the mobile telephone, thus restricting the likelihood that the telephone will be able to connect to establish a call.

One object of the invention is to provide a receiver architecture (such as may be incorporated in, for example, a mobile telephone) which is more likely to be able to establish a connection in a given location.

According to one aspect, the invention provides apparatus for preparing a signal, which has been received at a wireless communications device, to be processed by a receiver which will attempt to recover information conveyed by the signal, the apparatus comprising filtering means for filtering the signal in a digital form having samples appearing at a sample rate and adaption means for adjusting the sample rate, wherein the filtering means is capable of filtering the signal in a first manner which is required when the receiver is of a first type and in a second manner which is required when the receiver is of a second type, the adaption means is arranged to perform adjustments to the sample rate when the receiver is of the second and not the first type and the adjustments comprise altering the sample rate before the signal is filtered to permit the filtering means to perform filtering in the second manner and altering the sample rate after the signal has been filtered to provide the signal with a sample rate required by the second type of receiver.

The invention also consists in a method of preparing a signal, which has been received at a wireless-communications device, to be processed by a receiver which will attempt to recover information conveyed by the signal, the method comprising filtering the signal in a digital form having samples appearing at a sample rate using a filtering means capable of filtering the signal in a first manner when the receiver is of a first type and in a second manner when the receiver is of a second type and making sample rate adjustments to the signal when filtering is to be performed in the second manner but not when filtering is to be performed in the first manner, wherein said adjustments comprise adjusting the sample rate before the signal is filtered to permit the filtering means to perform filtering in the second manner and adjusting the sample rate after the signal has been filtered to provide the signal with a sample rate required by the second type of receiver.

Thus, the invention provides a processing stage that can interface with receivers of different types, meaning that a participant for a wireless communications network (e.g. a mobile telephone or a base station) can incorporate the processing stage according to the invention, leading to the design of a network participant that has the flexibility to use more than one type of receiver architecture to establish a call.

The processing scheme according to the invention is capable of operating on received communications signals formatted for the first and second receiver types. Typically, receivers of different types will require different sample rates for the processing of received communications signals in the digital domain. A receiver architecture will employ a crystal oscillator for providing a clock signal to control the sampling rate used for analogue to digital conversion of the received communications signals and it follows that different receiver architectures will require crystals operating at different frequencies. By adapting the sample rate of the output of the filtering means, the sample rate can be set to rates required by different receiver architectures without the need to provide a crystal oscillator specifically for each receiver architecture.

When conditioning signals for a receiver of the first type, the filtering process performs a first type of filtering and when conditioning signals for a receiver of the second type, the filtering process performs a second type of filtering. A single filtering means of an adjustable nature can be used to carry out the filtering, thus providing the advantage that the preparation of the signal for the receiver can be performed without requiring individual filtering means for the first and second receiver types.

In a preferred embodiment, the filtering of the signal is performed using an FIR filter arranged such that its tap coefficients are adjusted when switching operation between the types of receiver.

In a preferred embodiment, when signals are being conditioned for a receiver of the second type and the sample rate of the signal is being manipulated in advance of and following the filtering means, the filtering performed by the filtering means can be designed to eliminate errors arising from the manipulation of the sample rate.

Other signal processing operations can be performed on the signals within the invention as they pass between different parts of the signal processing scheme. For example, the signal to be supplied to the filtering process can be first be subjected to a correction for reducing any DC offset in the signal.

In one embodiment, the first type of receiver is a receiver operating according to a 3G telecommunications standard (e.g. UMTS) and comprising a rake receiver and the second type of receiver is a receiver operating according to a 2G telecommunications standard (e.g. GPRS) and comprising an equaliser.

By way of example only, an embodiment of the invention will now be described with reference to the accompanying drawings, in which:

FIG. 4 is a block diagram of a mobile telephone incorporating the chip of FIG. 1.

The mixed signal chip 10 of FIG. 1 receives signals from a radio section of a receiver architecture and conditions them for processing by a digital section of the receiver architecture (see FIG. 4, discussed later). Such a receiver architecture can be used in, for example, a basestation or a subscriber unit of a wireless telecommunications network. The chip 10 is designed to process received radio signals of both the UMTS standard (denoted 3G for "Third Generation" in the figures) and the GSM standard (denoted to 2G for "Second Generation" in the figures). When operating with GSM radio signals, the chip 10 outputs digital signals conditioned for use by an equaliser in a digital signal processor (DSP) forming part of a digital processing section of a receiver architecture containing chip 10. When operating with UMTS radio signals, the chip 10 outputs digital signals conditioned for use by a rake implemented in hardware and forming part of a digital processing section of a receiver architecture containing the chip 10.

Figure 1:
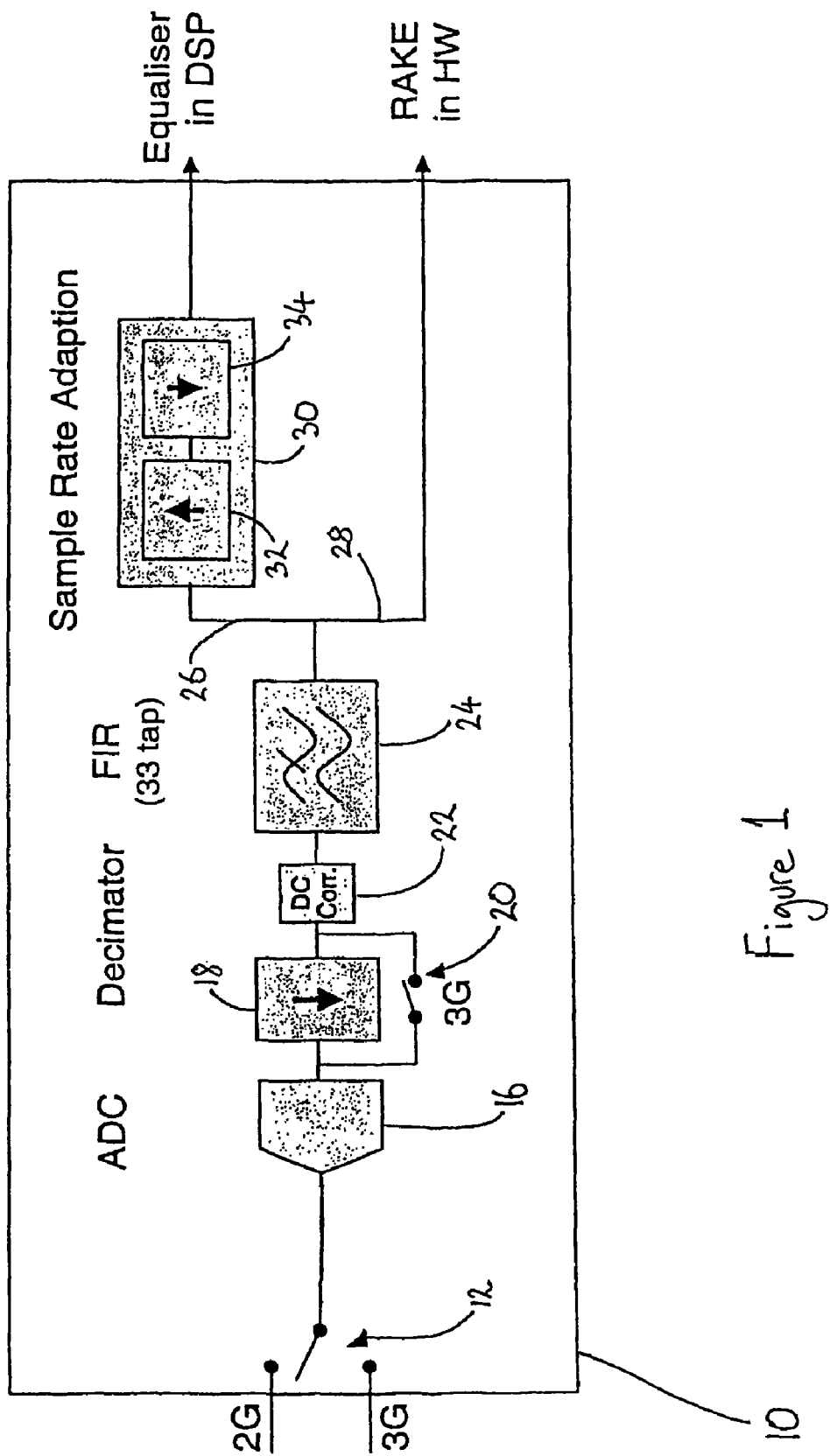
FIG. 1 is a block diagram of a mixed-signal chip.
Figure 2:
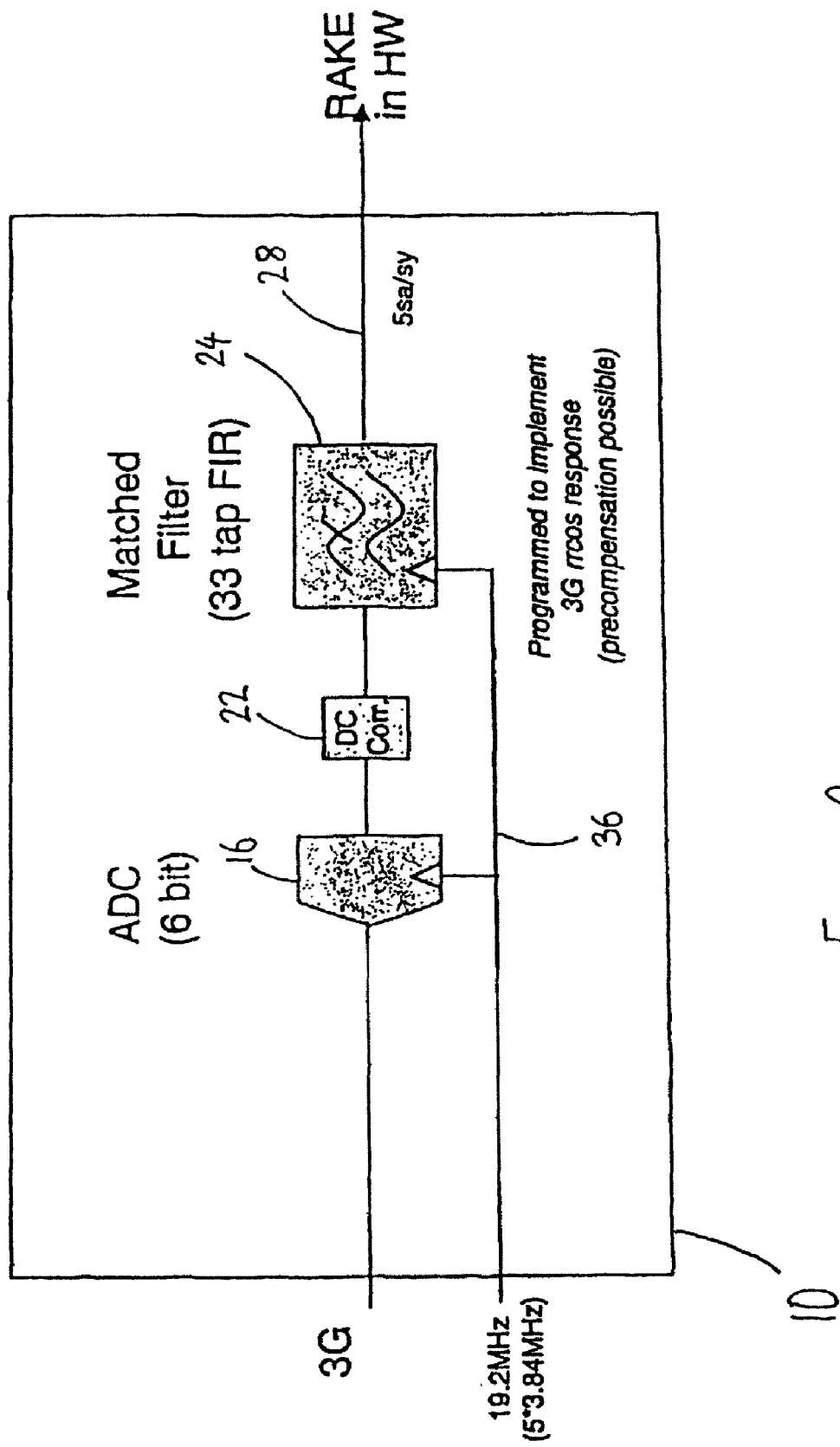
FIG. 2 is a block diagram of the chip of FIG. 1 operating in a 3G mode.
Figure 3:
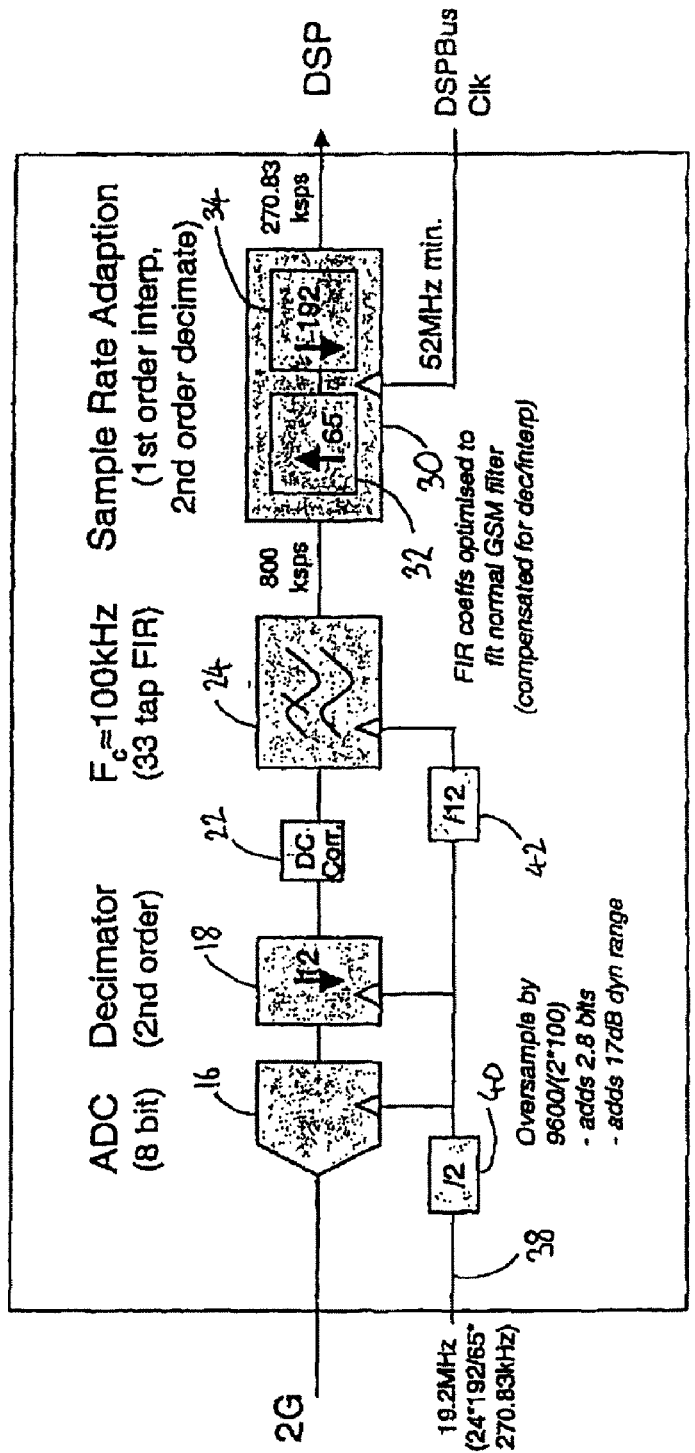
FIG. 3 is a block diagram of the chip of FIG. 1 operating in a 2G mode.

It should be noted that FIGS. 1 to 3 illustrate only the main blocks of the mixed-signal processing stage and a reader skilled in this art will appreciate that additional signal processing operations can be performed on or with the signals present in or used by the chip 10.

Chip 10 operates with an input in the form of a GSM radio signal or a UMTS input signal, these alternatives being indicated by switch 12. Signals supplied from the radio section of the receiver architecture enter the chip 10 and are supplied to analogue to digital converter (ADC) 16 having an overall dynamic range of 8 bits.

The output of ADC 16 is supplied to a second order decimator 18. The decimator 18 operates to reduce the sample rate of the output of ADC 16. However, the decimator 18 only operates when the chip 10 is working with GSM signals. Otherwise, when the chip 10 is working with UMTS signals, the decimator 18 is inactive. The selective operation of decimator 18 is indicated diagrammatically by switch 20 which is closed when the chip 10 operates with UMTS signals and is open when the chip 10 operates with GSM signals.

After decimator 18, which may or may not be active, the output of the ADC 16 is supplied to DC correction unit 22. Correction unit 22 functions to reduce any DC offset error present in the digital signal (e.g. due to frequency conversion in a radio section of a receiver architecture providing the radio signals received by the chip 10). The manner in which such a correction unit may be implemented is well known. From the correction unit 22, the digital signal passes to a 33-tap FIR digital filter 24. The output of the filter 24 can then follow one of two paths 26, 28.

Path 26 allows the digital signal representing the radio signals supplied to the chip 10 to be supplied to a DSP in a digital section of a receiver architecture and implementing an equaliser. Path 28 allows the digital signal representing the radio signals supplied to the chip 10 to be supplied to a rake forming part of the digital processing section of the receiver architecture. Path 26 includes a sample rate adaption unit 30 for adjusting the sample rate of the digital signal travelling on path 26 to the rate required for the equaliser. Adaption unit 30 comprises a first order interpolator 32 and a second order decimator 34. The interpolator 32 adds samples into the digital signal travelling on path 26 and decimator 34 removes samples from the signals travelling on path 26. By choosing appropriately the factors by which the interpolator 32 and the decimator 34 increase and decrease respectively the sample rate of the signal travelling along path 26, the sample rate of the signal supplied to the DSP can be set.

The operation of chip 10 with UMTS signals and GSM signals will now be described with reference to FIGS. 2 and 3 respectively.

In FIG. 2, only the main elements of chip 10 that are used in the processing of UMTS signals from a radio section of a receiver architecture are shown. For example, decimator 18 is not shown in FIG. 2. Elements in FIG. 2 that have already been described with reference to the FIG. 1 retain the same reference numerals.

In order to process UMTS signals, the mixed-signal chip 10 requires an ADC with a 6 bit dynamic range sampling at a rate of 19.2 MHz. As shown in FIG. 2, a clock signal at 19.2 MHz is supplied along path 36 and is used to control the operation of ADC 16 and filter 24. The clock signal at 19.2 MHz is derived by multiplying by a factor of 5 the frequency of a 3.84 MHz crystal oscillator located in the unit (e.g. mobile telephone) containing the chip 10. To satisfy the processing requirements for UMTS signals, the ADC 16 uses the 6 least significant bits of its dynamic range to output a 6 bit digital signal.

The ADC 16 outputs a signal at a sample rate of 19.2 MHz. This signal undergoes DC offset correction at correction unit 22 and then passes to the FIR filter 24. The taps of the FIR filter are programmed to implement a Raised Root Cosine response in order to meet the requirements of the UMTS standard. The filter may also be programmed to compensate for frequency distortions introduced by the radio section of the receiver architecture. The output of the filter is then passed from the chip 10 to a rake in a digital section of a receiver architecture where it is prepared for subsequent processing in the digital section (e.g. to ultimately recover speech information).

In FIG. 3, only the main elements of the chip 10 that are used in the processing of GSM signals from a radio section of a receiver architecture are shown. Elements in FIG. 3 that have already been described with reference to FIG. 1 retain the same reference numerals and their function will not be described again in so far as their function was described with reference to FIG. 2 and still remains the same in the GSM operating mode.

In order to process GSM signals, the mixed-signal chip 10 uses the same 19.2 MHz clock signal that is used for UMTS operation. The 19.2 MHz clock signal is supplied along path 38. The 19.2 MHz clock signal is passed to a clock divider 40 which halves the rate of the clock signal to 9.6 MHz. The 9.6 MHz clock signal is used to clock the ADC 16 and the second order decimator 18. Therefore, the ADC outputs a digital signal with a sample rate of 9600 ksps ("kilo" samples per second). The output of the ADC 16 is supplied to the decimator 18 which performs a factor of 12 reduction in the sample rate of the output of the ADC 16. Therefore, the output of the decimator 18 has a sample rate of 800 ksps. The output of the second order decimator 18 undergoes DC offset correction at correction unit 22 and is then supplied to the FIR filter 24.

Since the input to the filter 24 has a sample rate of 800 ksps, the signal used to clock the filter needs to have a rate of 800 kHz. The clock signal for the filter is supplied by a clock divider 42 operating on the 9.6 MHz clock signal provided by clock divider 40. Clock divider 42 reduces the 9.6 MHz clock signal by a factor of 12 to produce a clock signal at the rate of 800 kHz required by filter 24. When operating in the GSM mode, the tap coefficients of the filter 24 are chosen to provide an optimal fit for a normal GSM filter, taking into account the frequency spectrum errors introduced by the decimator 18 and the adaption unit 30. That is, the filter coefficients are chosen to correct for any frequency distortion of the spectrum caused by decimator 18 and to provide an advance correction for any distortion of the frequency spectrum that will be caused downstream by the adaption unit 30. The filter may also be programmed to compensate for frequency distortions introduced by the radio section of the receiver architecture.

The adaption unit 30 uses a combination of interpolation and decimation to allow the output of filter 24 to attain a sample rate of 270.83 ksps as required by a GSM equaliser. Within adaption unit 30, the output of the filter 24 is first interpolated to increase the sample rate by a factor of 65 (at 32) and is then decimated (at 34) to reduce the sample rate by a factor of 192. The net effect of the adaption unit 30 is to change the sample rate of the output of filter 24 by a factor of $65/192$ the filter output with a sample rate of 270.83 ksps. The adaption unit 30 is not clocked using the signal supplied to path 38. The adaption unit is clocked by a clock signal supplied by the DSP and having a minimum clock frequency of 52 MHz. On the assumption that the interpolator 32 can insert one sample value per clock cycle, 52 MHz is the minimum clock frequency that will permit the 800 ksps output of the filter to be interpolated by a factor of 65.

In the embodiment of FIGS. 1, 2 and 3, a single clock signal of 19.2 MHz is supplied to a mixed signal chip in order to produce GSM and UMTS outputs with sample rates of 270.83 and 19200 ksps respectively. Since the 19.2 MHz clock signal is used in both GSM and UMTS modes, there is no need to provide different clock signals for each mode with the result that only a single crystal oscillator is required, generating a 19.2 MHz signal. Moreover, the use of a reconfigurable filter (FIR filter 24) permits a single piece of filtering hardware to be used to perform the differing types of filtering required by UMTS and GSM.

The mixed signal chip 10 will typically form part of a receiver architecture located within, for example, a mobile phone such as that shown in FIG. 4. FIG. 4 shows only the main elements of a mobile telephone as required for the reception of signals. Signals are received at antenna 44 and are processed in radio section 46. The resulting received radio signals then need to be processed in the digital domain by digital processing section 48 and are therefore conditioned appropriately by the mixed signal chip 10.

The invention claimed is:

1. Apparatus for preparing a signal, which is one of the UMTS and GSM signal, and has been received at a wireless communications device, to be processed by a receiver which will attempt to recover information conveyed by the signal, the apparatus comprising:
   a filter to filter the signal in a digital form having samples appearing at a sample rate; and
   an adjuster to adjust the sample rate,
   wherein the filter filters the signal in both a first manner which is required when the receiver is a UMTS receiver and a second manner which is required when the receiver is a GSM receiver,
   wherein the adjuster performs adjustments to the sample rate when the receiver is the GSM receiver and the adjustments comprise altering the sample rate before the signal is filtered to permit the filter to perform filtering in the second manner and altering, using a combination of an interpolator followed by a decimator, the sample rate after the signal has been filtered to provide the signal with a sample rate required by the GSM receiver, whereas the filter performs filtering in the first manner without the adjustments to the sample rate when the receiver is the UMTS receiver,
   wherein the filter comprises an FIR filter with adjustable tap coefficients which can be adjusted to allow the filter to perform filtering in the first manner and in the second manner.

2. Apparatus according to claim 1, wherein the adjuster is adapted to change to said sample rate by a fractional factor.

3. Apparatus according to claim 1, wherein the filter is adapted to correct errors introduced by the adjuster.

4. Apparatus according to claim 1, wherein the UMTS receiver comprises a rake receiver for operating on the signal and the GSM receiver comprises an equaliser for operating on the signal.

5. A participant for a wireless communications network, the participant comprising the apparatus of claim 1.

6. A method of preparing a signal, which is one of the UMTS signal and GSM signal, and has been received at a wireless-communications device, to be processed by a receiver which will attempt to recover information conveyed by the signal, the method comprising:
   filtering the signal in a digital form having samples appearing at a sample rate using a filter to filter the signal in both a first manner when the receiver is a UMTS receiver and a second manner when the receiver is a GSM receiver and making sample rate adjustments to the signal when filtering is to be performed in the second manner but no sample rate adjustments to the signal when filtering is to be performed in the first manner,
   wherein said adjustments comprise adjusting the sample rate before the signal is filtered to permit the filter to perform filtering in the second manner and adjusting the sample rate after the signal has been filtered to provide the signal with a sample rate required by the GSM receiver,
   wherein adjusting the sample rate after the signal has been filtered comprises adding samples using an interpolator and then removing samples using a decimator, and
   wherein the filter comprises an FIR filter with adjustable tap coefficients which can be adjusted to allow the filter to perform filtering in the first manner and in the second manner.

7. A method according to claim 6, wherein said adjustments are arranged to change to said sample rate by a fractional factor.

8. A method according to claim 6, wherein the UMTS receiver comprises a rake receiver for operating on the signal and the GSM receiver comprises an equaliser for operating on the signal.

9. A mixed signal section for a participant for a wireless communications network, the mixed signal section comprising the apparatus of claim 1.

10. In a wireless receiver an apparatus for processing a signal which is one of the UMTS signal and GSM signal in form of digital samples appearing at a sample rate, the apparatus comprising:
   a decimator for bypassing the signal when the wireless receiver is a UMTS receiver and altering the sample rate of the signal when the wireless receiver is a GSM receiver;
   a filter for filtering the bypassed signal when the wireless receiver is the UMTS receiver and filtering the decimated signal when the wireless receiver is the GSM receiver; and an adaptor for altering the sample rate of the filtered signal when the wireless receiver is the GSM receiver, the adaptor adjusting the sample rate of the signal before the filter and adjusting the sample rate of the filtered signal after the filter, wherein the adaptor for adjusting the sample rate of the filtered signal after the filter comprises a combination of an interpolator followed by a decimator, and wherein the filter comprises an FIR filter with adjustable tap coefficients which can be adjusted to allow the filter to perform filtering in the first manner and in the second manner.

11. The apparatus according to claim 10, wherein the adaptor comprises:

an interpolation unit for increasing the sample rate of the filtered signal; and another decimator for decreasing the sample rate of the filtered signal.

12. The apparatus according to claim 10, wherein the filter is adapted to correct errors introduced by the decimator.

13. The apparatus according to claim 10, further comprising a switch electrically connected with the decimator for selecting the signal received from one of the UMTS receiver and the GSM receiver.

14. The apparatus according to claim 13, further comprising another switch electrically connected with the decimator for bypassing the signal.

15. Apparatus according to claim 10, wherein the UMTS receiver comprises a rake receiver for operating on the signal and the GSM receiver comprises an equaliser for operating on the signal.

16. In a wireless receiver a method for processing a signal which is one of the UMTS signal and GSM signal in form of digital samples appearing at a sample rate, the method comprising:

receiving the signal which is one of the UMTS signal and GSM signal;

bypassing the received signal when the wireless receiver is a UMTS receiver and altering the sample rate of the received signal when the wireless receiver is a GSM receiver;

filtering the bypassed signal when the wireless receiver is the UMTS receiver and filtering a resulting decimated signal when the wireless receiver is the GSM receiver; and altering the sample rate of both the signal before filtering and the filtered signal after filtering when the wireless receiver is the GSM receiver, wherein altering the sample rate after filtering comprises adding samples using an interpolator and then removing samples using a decimator.

17. A method according to claim 16, wherein the UMTS receiver comprises a rake receiver for operating on the signal and the GSM receiver comprises an equaliser for operating on the signal.

18. A mixed signal section for a participant for a wireless communications network, the mixed signal section comprising the apparatus of claim 10.

19. Apparatus according to claim 1, wherein the filter is programmed to compensate for frequency distortions introduced by a receiver of which the apparatus is a part.

20. The method of claim 6, further comprising programming the filter to compensate for frequency distortions introduced by a receiver within the wireless-communications device.

21. The apparatus according to claim 10, wherein the filter is programmed to compensate for frequency distortions introduced by a receiver of which the apparatus is a part.

* * * * *